United States Patent [19]
Shekleton

[11] Patent Number: 5,233,825
[45] Date of Patent: Aug. 10, 1993

[54] TANGENTIAL AIR BLAST IMPINGEMENT FUEL INJECTED COMBUSTOR

[75] Inventor: Jack R. Shekleton, San Diego, Calif.

[73] Assignee: Sundstrand Corporation, Rockford, Ill.

[21] Appl. No.: 652,008

[22] Filed: Feb. 7, 1991

[51] Int. Cl.⁵ ................................................ F23R 3/54
[52] U.S. Cl. .................................... 60/39.36; 60/738; 60/743; 60/755
[58] Field of Search ............. 60/39.36, 39.75, 39.83, 60/737, 738, 739, 740, 743, 746, 755, 756, 758, 760; 431/354; 239/418, 432, 433

[56] References Cited

U.S. PATENT DOCUMENTS

| | | | |
|---|---|---|---|
| 4,018,043 | 4/1977 | Clemmens | 60/39.36 |
| 4,151,709 | 5/1979 | Melconian et al. | 60/39.36 |
| 5,027,603 | 7/1991 | Shekleton et al. | 60/743 |

Primary Examiner—Richard A. Bertsch
Assistant Examiner—Timothy S. Thorpe
Attorney, Agent, or Firm—Wood, Phillips, VanSanten, Hoffman & Ertel

[57] ABSTRACT

In order to efficiently atomize a fuel/air mixture to reduce smoke, a fuel injection system (26) for a combustor (12) of a turbine engine (10) includes an air blast tube (16), a fuel supply passage (42), and an impingement surface (30). The air blast tube (16) is mounted in relation to an opening (18) in a wall (20) of the combustor (12) such that a first end (22) of the tube (16) is in communication with the combustor (12) and a second end (24) of the tube (16) is in communication with a source of compressed air externally of the combustor (12) to facilitate the delivery of compressed air from the source into the combustor (12). The fuel supply passage (42) is adapted to deliver fuel to a fuel supply orifice (28) by having a first end (34) in communication with the combustor (12) through the fuel supply orifice (28) and a second end (36) in communication with a source of fuel externally of the combustor (12) with the fuel supply orifice (28) being disposed externally of but adjacent to the air blast tube (16). The impingement surface (30) is positioned in the path of fuel discharged from the fuel supply orifice (28) to produce a fuel spray directed into the path of compressed air discharged from the air blast tube (16) at a point externally of the air blast tube (16) for producing an interaction of the fuel spray and compressed air within the combustor (12). With the unique arrangement of the air blast tube (16) and fuel supply passage (42), the fuel injection system (26) is particularly well suited for producing an atomized fuel/air mixture in an efficient smoke-reducing manner.

14 Claims, 2 Drawing Sheets ps,233,825

TANGENTIAL AIR BLAST IMPINGEMENT FUEL INJECTED COMBUSTOR

FIELD OF THE INVENTION

The present invention is directed generally to a fuel injection system and, more particularly, to a tangential air blast impingement fuel injection system.

BACKGROUND OF THE INVENTION

In recent years, it is known that there have been a number of significant improvements in the field of fuel injection. This is particularly true in the case of fuel injection systems for combustors of turbine engines wherein, for certain applications, it has been proposed to utilize tangential or semi-tangential injection by means of impingement surfaces located within tangentially directed air blast tubes. Generally speaking, this particular fuel injector utilizes what has become known as impingement fuel pressure atomization.

While considerably more efficient than swirl pressure atomization, there are nonetheless certain well recognized problems to be addressed. These include the wide variety of operating conditions which can be encountered, i.e., low altitude operation which typically requires higher fuel flows and high altitude operation which requires very low fuel flows. Because of this inverse relationship between altitude and fuel flow requirements, there has been a need to develop fuel injection systems that are highly versatile.

As mentioned hereinabove, one successful fuel injection proposal has included utilizing tangential injection by means of impingement surfaces located within tangentially directed air blast tubes. This impingement fuel pressure atomization has represented a significant improvement for certain applications but, nonetheless, can suffer from certain deficiencies, particularly where it is desirable to mount the fuel injection system in the dome of the combustor. Because of the geometry of a turbine engine, it is essentially impossible to mount the fuel supply passage in an air blast tube in order to provide tangential or semi-tangential injection.

Because of this fact, fuel injection systems have typically been characterized by less efficient atomization in applications that require one or more dome-mounted injectors. This, in turn, is a problem in terms of efficiency and operation under the wide variety of operating conditions that can be encountered in practical applications. Furthermore, the absence of efficient atomization in combustors has often resulted in undesirable amounts of smoke being emitted therefrom.

In the case of smaller turbine engines, the exit diameter of the air blast tube is also proportionately reduced in size. Thus, on engines for smaller auxiliary power units, which can be, by way of example, on the order of as low as 50 horsepower, any significant blockage of the flow of compressed air through the air blast tube is not acceptable since the diameter of the fuel supply tube would remain relatively constant. While the number of injectors can be minimized to maximize the diameter of the air blast tubes, the problem nevertheless remains.

The present invention is directed to overcoming one or more of the foregoing problems and achieving one or more of the resulting objects.

SUMMARY OF THE INVENTION

It is a principal object of the present invention to provide a fuel injection system for a combustor of a turbine engine. It is also an object of the present invention to provide such a fuel injection system while minimizing blockage of the path of compressed air through an air blast tube from the presence of the fuel supply tube but at the same time achieving efficient atomization to reduce smoke emitted from a combustor. Furthermore, it is an object of the present invention to provide a fuel injection system in the form of a tangential air blast impingement fuel injected combustor.

Accordingly, the present invention is directed to a fuel injection system for a combustor of a turbine engine having an air blast tube, fuel supply means, and impingement surface means. The air blast tube is mounted in relation to an opening in a wall of the combustor and has a first end in communication with the combustor and a second end in communication with a source of compressed air externally of the combustor so as to be operable to deliver compressed air from the source into the combustor. The fuel supply means delivers fuel to a fuel supply orifice and has a first end in communication with the combustor through the fuel supply orifice and a second end in communication with a source of fuel externally of the combustor with the fuel supply orifice being disposed externally of but adjacent to the air blast tube. The impingement surface means is positioned in the path of fuel discharged from the fuel supply orifice to produce a fuel spray directed into the path of compressed air discharged from the air blast tube at a point externally of the air blast tube for interaction between the fuel spray and compressed air within the combustor to produce an atomized fuel/air mixture. In a preferred embodiment of the invention, the wall of the combustor is a dome and the air blast tube has a generally cylindrical discharge opening disposed at an acute angle thereto.

With this understanding of the invention, the fuel supply means preferably includes a fuel supply passage extending from the source of fuel to the fuel supply orifice externally of the air blast tube. The fuel supply passage is advantageously defined by a fuel supply tube extending to a point adjacent a discharge opening of the air blast tube. Additionally, the impingement surface means preferably includes a finger facing the fuel orifice at the end of the fuel supply tube at an acute angle to the path of discharged fuel.

In a typical application, the fuel injection system will include a plurality of air blast tubes mounted in circumferentially spaced relation. The air blast tubes are each advantageously mounted in the dome of the combustor and operable to deliver compressed air from the source generally tangentially into the combustor. For such a typical application, the fuel supply means will be arranged to deliver fuel to each of a plurality of fuel supply orifices.

As will be appreciated, each of the fuel supply orifices will be disposed externally of but adjacent to the discharge opening of one of the air blast tubes. It will also be appreciated that, for such an application, impingement surface means will be positioned in the path of fuel discharged from each of the fuel supply orifices to produce a fuel spray. More specifically, the fuel sprays will each be directed into the path of compressed air discharged from the corresponding one of the air blast tubes at a point externally thereof.

In a highly preferred embodiment, the discharge opening of each of the air blast tubes is generally cylindrically shaped and disposed at an angle to the dome of the combustor. The discharge opening of each of the air blast tubes also advantageously has an outermost point adjacent the dome of the combustor and an innermost point diametrically opposite the outermost point thereof. Preferably, the discharge opening of each of the air blast tubes is disposed at an acute angle and arranged between approximately 20 and 30 degrees.

As for the fuel supply means, it preferably includes a fuel supply passage extending from the source of fuel to each of the fuel supply orifices. The fuel supply passages are each advantageously defined by a fuel supply tube extending to a point externally of but adjacent to one of the discharge openings and the fuel supply orifices are each adapted to direct fuel into the combustor generally perpendicularly of the dome of the combustor. With this arrangement, the impingement surface means preferably includes a finger facing each of the fuel supply orifices in the path of fuel discharged therefrom.

As previously mentioned, the discharge opening of each of the air blast tubes is preferably disposed at an acute angle to the dome of the combustor. The fingers comprising the impingement surface means are then each advantageously disposed at an acute angle to the dome of the combustor greater than the acute angle of the discharge openings. In this manner, the fuel sprays and compressed air interact within the combustor to produce a highly efficiently atomized fuel/air mixture.

Other objects, advantages and features of the present invention will become apparent from a consideration of the following specification taken in conjunction with the accompanying drawings.

DETAILED DESCRIPTION OF THE PREFERRED EMBODIMENT

Figure 1:
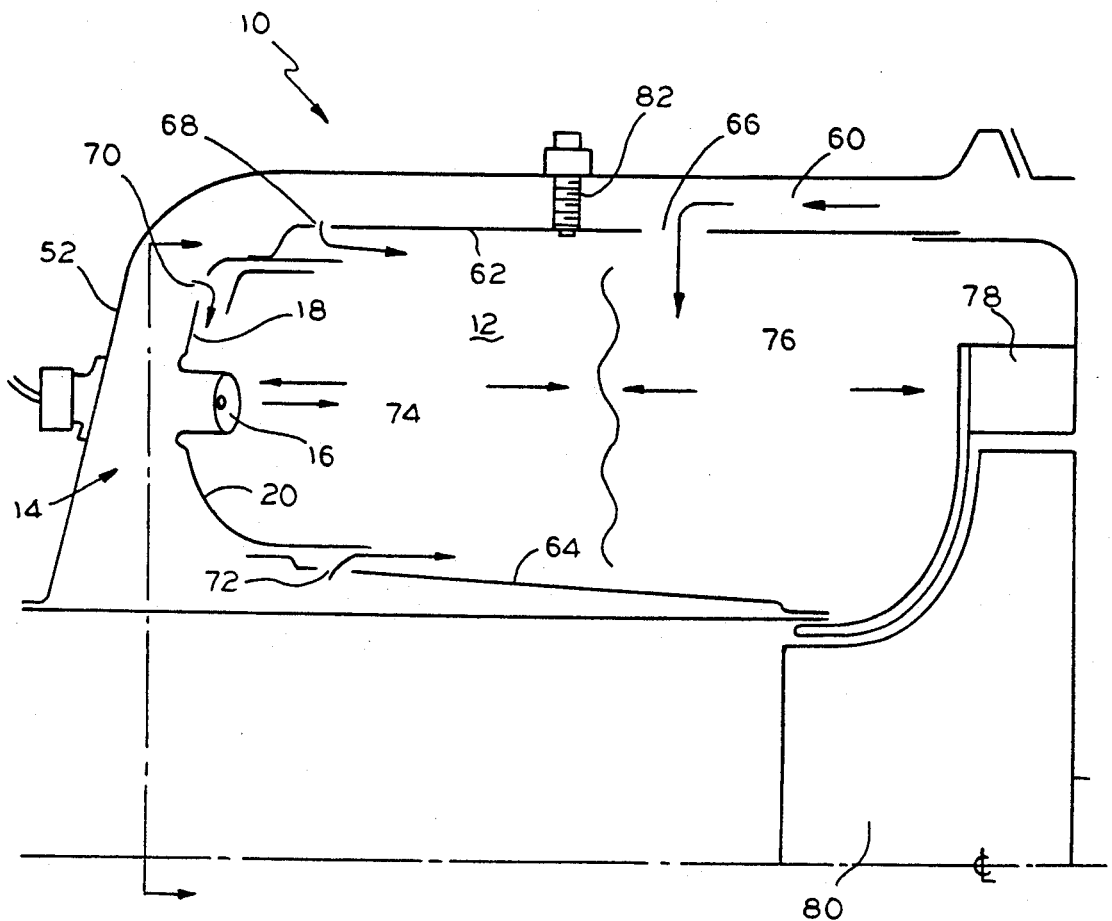
FIG. 1 is a cross-sectional view of a fuel injection system for a combustor of a turbine engine in accordance with the present invention.

Referring to the drawings, and first to FIG. 1, the reference numeral 10 designates generally a portion of a turbine engine having a combustor 12 with a fuel injection system generally designated 14. The fuel injection system 14 includes an air blast tube 16 mounted in relation to an opening 18 in a wall 20 which may comprise the dome of the combustor 12. The air blast tube 16 has a first end 22 (see, also, FIG. 3) which is in communication with the combustor 12 and a second end 24 which is in communication with a source of compressed air externally of the wall or dome 20 of the combustor 12 whereby the air blast tube 16 is operable to deliver compressed air from the source into the combustor 12. The fuel injection system 14 also includes fuel supply means generally designated 26 for delivering fuel to a fuel supply orifice 28. As will be appreciated especially by referring to FIG. 3, the fuel injection system 14 further includes impingement surface means 30 positioned in the path of fuel discharged from the fuel supply orifice 28 to produce a fuel spray as at 32.

Figure 3:
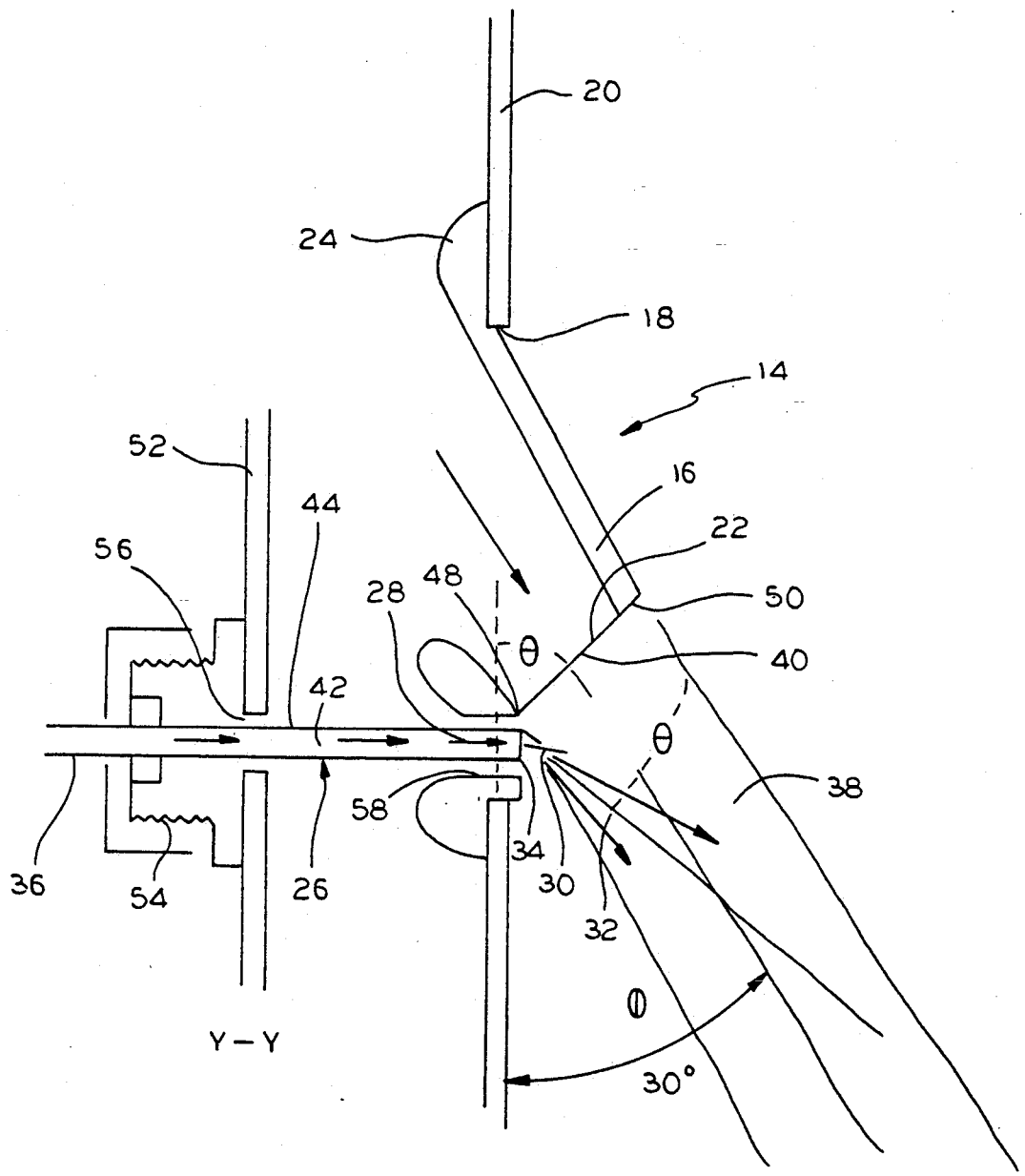
FIG. 3 is a cross-section view taken on the line 3—3 of FIG. 2.

Still referring to FIG. 3, the fuel supply means 26 has a first end 34 in communication with the combustor 12 through the fuel supply orifice 28 and a second end 36 in communication with a source of fuel externally of the wall or dome 20 of the combustor 12. The fuel supply orifice 28 is disposed externally of but adjacent to the air blast tube 16 such that the fuel spray as at 32 is directed into the path of compressed air as at 38 which is discharged from the air blast tube 16 at a point externally of the air blast tube 16. As shown most clearly in FIG. 3, the fuel spray as at 32 and compressed air as at 38 interact within the combustor 12 so as to produce an efficiently and effectively atomized fuel/air mixture.

As for additional details of the invention, the air blast tube 16 includes a generally cylindrical discharge opening 40 disposed at an acute angle $\theta$ to the wall or dome 20 of the combustor 12. It will also be seen that the fuel supply means 26 includes a fuel supply passage 42 defined by a fuel supply tube 44 extending from the source of fuel to the fuel supply orifice 28 at a point adjacent the discharge opening 40 of the air blast tube 16. Still referring to FIG. 3, the impingement surface means 30 comprises a finger facing the fuel supply orifice 28 at an acute angle $\theta_1$ to the path of discharged fuel.

Figure 2:
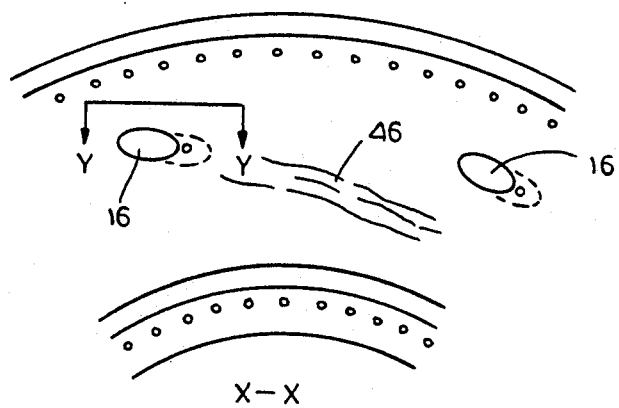
FIG. 2 is a cross-sectional view taken on the line 2—2 of FIG. 1.

Referring now to FIG. 2, the fuel injection system 14 in a typical application will include a plurality of air blast tubes 16. The air blast tubes 16 will then suitably be mounted in circumferentially spaced relation in the dome 20 of the combustor 12 and will be arranged so as to deliver compressed air from the source generally tangentially into the combustor 12 as indicated at 46. In addition, the fuel supply means 26 will be adapted to deliver fuel through suitable fuel supply tubes such as 44 to each of a plurality of fuel supply orifices 28.

As will be appreciated, each of the fuel supply orifices 28 will be disposed externally of but adjacent to the discharge opening 40 of one of the air blast tubes 16. It will also be appreciated that impingement surface means, preferably in the form of a finger 30, will be positioned in the path of fuel discharged from each of the fuel supply orifices 28 to produce a fuel spray such as that indicated at 32 in FIG. 3. With this understanding, the fuel sprays will each be directed into the corresponding path of compressed air from the corresponding one of the air blast tubes 16 at a point externally thereof.

Referring once again to FIG. 3, the discharge opening 40 of each of the air blast tubes 16 has an outermost point 48 adjacent the dome 20 of the combustor 12 and an innermost point 50 diametrically opposite the outermost point 48 thereof. It will, thus, be seen that the fuel supply orifices 28 each direct fuel into the combustor 12 generally perpendicularly of the dome 20 of the combustor 12 and generally immediately adjacent to the outermost point 48 of the corresponding one of the discharge openings 40. As will also be seen, the fingers 30 each are disposed at an acute angle $\theta_1$ to the dome 20 greater than the acute angle $\theta$ of the corresponding discharge opening 40.

Because of this arrangement, the fuel spray as at 32 will be directed slightly into and along the compressed air path as at 38. Thus, the compressed air in the compressed air path as at 38 is caused to interact with the fuel spray as at 32 immediately downstream of the air blast tube 16. Because of this interaction, an efficiently atomized fuel/air mixture is directed generally tangentially into the combustor 12.

Referring to FIG. 3, the fuel supply tube 44 will normally be secured externally of a combustor casing 52 by means of a suitable fitting 54. It will extend through an opening 56 in the combustor casing 52 and through an aligned opening 58 in the dome 20 of the combustor 12. As shown in FIG. 3, the fuel supply tube 44 will extend generally perpendicular to the dome 20 of the combustor 12.

In a preferred embodiment, the discharge opening 40 of each of the air blast tubes 16 will be disposed such that compressed air is discharged therefrom at an acute angle $\theta$. Preferably, this angle is in a range of between approximately 20 and 30 degrees. As will be appreciated, the finger 30 will be disposed at an acute angle $\theta$ greater than that of the compressed air discharged from the discharge opening 40 of each of the air blast tubes 16.

Referring once again to FIG. 1, the turbine engine 10 preferably includes a compressed air flow path 60 leading from what may suitably comprise a conventional compressor (not shown). The compressed air flow path 60, as illustrated, is defined by the space between the outer combustor wall 62, the combustor dome 20, and inner combustor wall 64 as an inner boundary thereof and the combustor casing 52 as an outer boundary thereof. With this arrangement, there will be dilution air holes as at 66 and air film supplies 68, 70 and 72 in the particular turbine engine 10 that has been shown for purposes of illustrating the inventive fuel injection system 14.

Still referring to FIG. 1, it will be appreciated that the invention has been illustrated in connection with a combustor 12 of a radial reverse flow type of turbine engine assembly 10. Thus, the combustor 12 will have a flame zone 74 and a dilution zone 76 leading to the turbine nozzle 78 and turbine 80 While the invention has been illustrated in connection with a radial reverse flow type of turbine engine 10, it will be appreciated that it has applicability to other types of turbine engines as well.

In practice, the air blast tubes 16 will supply some of the combustion air at a velocity of several hundred feet per second. This, in conjunction with the impingement type of fuel injectors comprised of fuel supply tubes having fingers at the fuel supply orifices thereof, will serve to greatly enhance fuel atomization. Since there will typically be a plurality of air blast tubes 16 and impingement type fuel injectors 26, they will normally be equally spaced about the combustor dome 20.

Because of the attributes of the air blast tubes 16, the fuel injectors 26 require very low fuel pressure and this, in turn, allows a very simple fuel system to be utilized in a most effective manner. As will be appreciated, one of the fuel injectors 26 will comprise a main/start impingement injector for directing an air/fuel mixture at an ignitor 82 positioned at the point of impact of the mixture on the outer combustor wall 62.

While in the foregoing there has been set forth a preferred embodiment of the invention, it will be appreciated by those skilled in the art that the details herein given may be varied without departing from the true spirit and scope of the appended claims.

I claim:

1. A fuel injection system for a combustor of a turbine engine, comprising:

an air blast tube mounted in relation to an opening in a wall of said combustor, said air blast tube having a first end defining a discharge opening in communication with said combustor, said discharge opening being disposed at an acute angle to said wall of said combustor and having an outermost point adjacent said wall and an innermost point diametrically opposite thereof, said air blast tube also having a second end in communication with a source of compressed air externally of said wall of said combustor, said air blast tube being operable to deliver compressed air from said source into said combustor;

fuel supply means for delivering fuel to a fuel supply orifice, said fuel supply means having a first end in communication with said combustor through said fuel supply orifice and a second end in communication with a source of fuel externally of said wall of said combustor, said fuel supply orifice being disposed externally of but immediately adjacent to said outermost point of said discharge opening at said first end of said air blast tube; and impingement surface means positioned in the path of fuel discharged from said fuel supply orifice to produce a fuel spray, said fuel spray being directed into the path of compressed air discharged from said air blast tube at a point externally of said air blast tube, said fuel spray and compressed air interacting within said combustor to produce an atomized fuel/air mixture.

2. The fuel injection system of claim 1 wherein said air blast tube includes a generally cylindrical discharge opening.

3. The fuel injection system of claim 1 wherein said fuel supply means is defined by a fuel supply tube extending to a point immediately adjacent said outermost point of said discharge opening at said first end of said air blast tube.

4. The fuel injection system of claim 1 wherein said impingement surface means includes a finger facing said fuel orifice at an acute angle to the path of discharged fuel.

5. A fuel injection system for a combustor of a radial turbine engine, comprising:

a plurality of air blast tubes mounted in circumferentially spaced relation in a dome of said combustor, each of said air blast tubes having a first end including a discharge opening for directing compressed air into said combustor through said dome of said combustor, each of said discharge openings being disposed at an acute angle to said wall of said combustor and having an outermost point adjacent said wall and an innermost point diametrically opposite thereof, each of said air blast tubes also having a second end in communication with a source of compressed air externally of said dome of said combustor, said air blast tube being operable to deliver compressed air from said source generally tangentially into said combustor;

fuel supply means for delivering fuel to each of a plurality of fuel supply orifices in communication with said combustor, said fuel supply orifices also being in communication with a source of fuel externally of said dome of said combustor through said fuel supply means, each of said fuel supply orifices being disposed externally of but immediately adjacent to said discharge opening at said first end of one of said air blast tubes; and impingement surfaces means positioned in the path of fuel discharged from each of said fuel supply orifices to produce a fuel spray, each of said fuel sprays being directed into the path of compressed air discharged from the corresponding one of said air blast tubes at a point externally thereof, said fuel sprays and compressed air interacting within said combustor to produce an atomized fuel/air mixture.

6. The fuel injection system of claim 5 wherein said discharge opening of each of said air blast tubes is generally cylindrically shaped.

7. The fuel injection system of claim 5 wherein said fuel supply means are each defined by a fuel supply tube extending to a point immediately adjacent said outermost point of one of said discharge openings.

8. The fuel injection system of claim 5 wherein said fuel supply orifices each direct fuel into said combustor generally perpendicularly of said dome of said combustor.

9. The fuel injection system of claim 8 wherein said impingement surface means includes a finger facing each of said fuel supply orifices in the path of fuel discharged therefrom.

10. The fuel injection system of claim 5 wherein said fingers each are disposed at an acute angle to said dome of said combustor greater than said acute angle of said discharge openings.

11. A fuel injection system for a combustor of a radial turbine engine, comprising:
   a plurality of air blast tubes mounted in circumferentially spaced relation in a dome of said combustor, each of said air blast tubes having a first end including a discharge opening disposed at an acute angle to said dome of said combustor for directing compressed air into said combustor through said dome of said combustor, each of said discharge openings having an outermost point adjacent said dome and an innermost point diametrically opposite thereof, each of said air blast tubes also having a second end in communication with a source of compressed air externally of said dome of said combustor, said air blast tube being operable to deliver compressed air from said source generally tangentially into said combustor;
   fuel supply means including a fuel supply passage extending from a source of fuel for delivering fuel to each of a plurality of fuel supply orifices, said fuel supply orifices each being in communication with said combustor through said dome of said combustor to direct fuel into said combustor generally perpendicularly of said dome of said combustor, each of said fuel supply orifices being disposed externally of but immediately adjacent to said outermost point of said discharge opening at said first end of one of said air blast tubes; and
   impingement surface means positioned in the path of fuel discharged from each of said fuel supply orifices to produce a fuel spray, said impingement surface means including a finger facing each of said fuel supply orifices in the path of fuel discharged therefrom, said fingers causing said fuel sprays to be directed into the path of compressed air discharged from the corresponding one of said air blast tubes at a point externally thereof;
   said discharge opening of each of said air blast tubes being disposed at a first acute angle to said dome of said combustor, said fingers each being disposed at a second, greater acute angle to said dome of said combustor whereby said fuel sprays and compressed air interact within said combustor to produce an atomized fuel/air mixture.

12. The fuel injection system of claim 11 wherein said discharge opening of each of said air blast tubes is generally cylindrically shaped.

13. The fuel injection system of claim 11 wherein said fuel supply passages are each defined by a fuel supply tube extending to a point immediately adjacent to said outermost point of one of said discharge openings.

14. The fuel injection system of claim 11 wherein said discharge opening of each of said air blast tubes is disposed such that compressed air is discharged therefrom at an acute angle in a range of between approximately 20 and 30 degrees.

* * * * *